No. 859,984. PATENTED JULY 16, 1907.
E. G. SMITH.
REVERSING GEAR.
APPLICATION FILED MAR. 23, 1906.
2 SHEETS—SHEET 2.
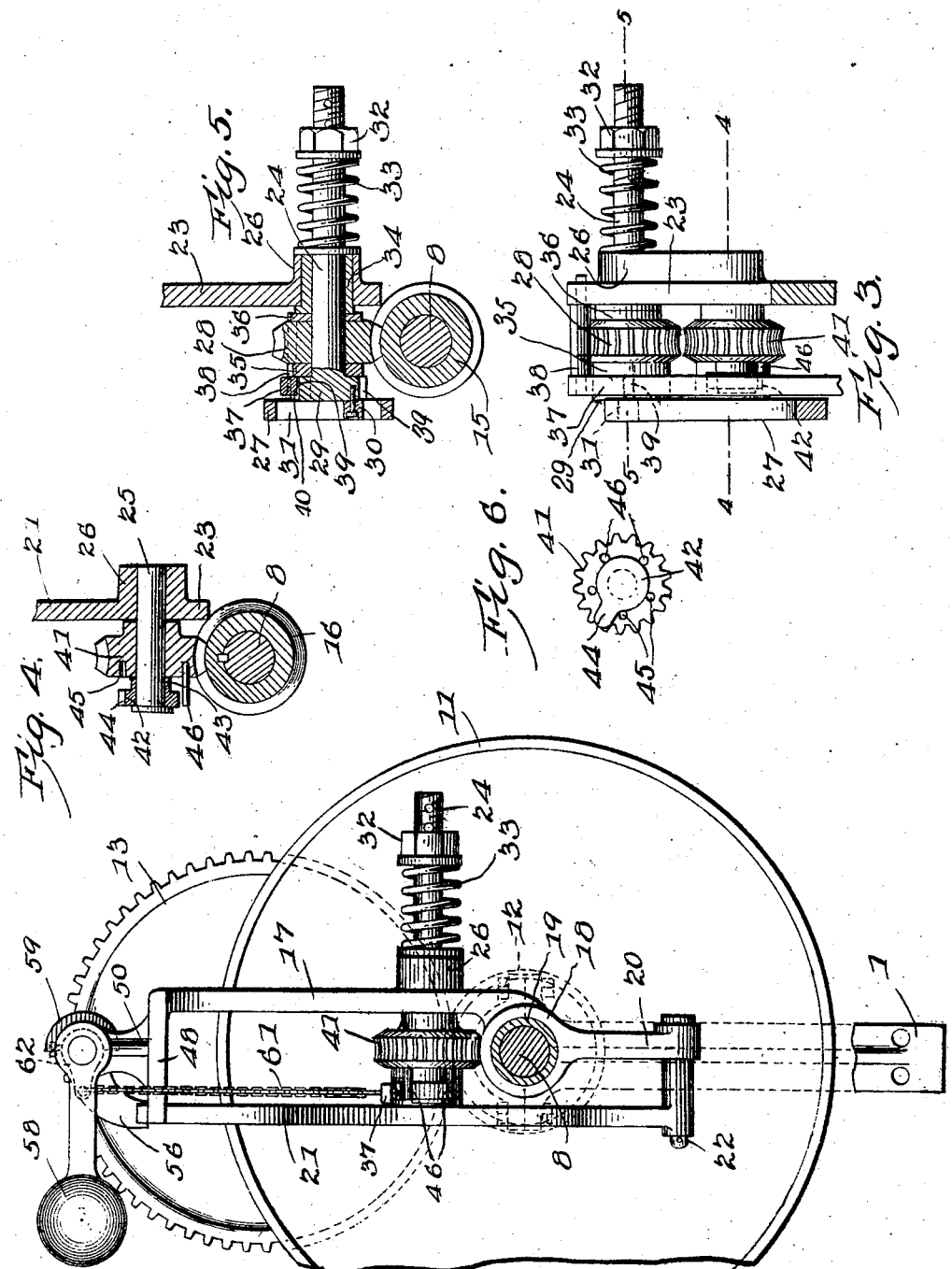
WITNESSES:
*Ernst G. Smith*, INVENTOR
By C. A. Snow & Co.
ATTORNEYS

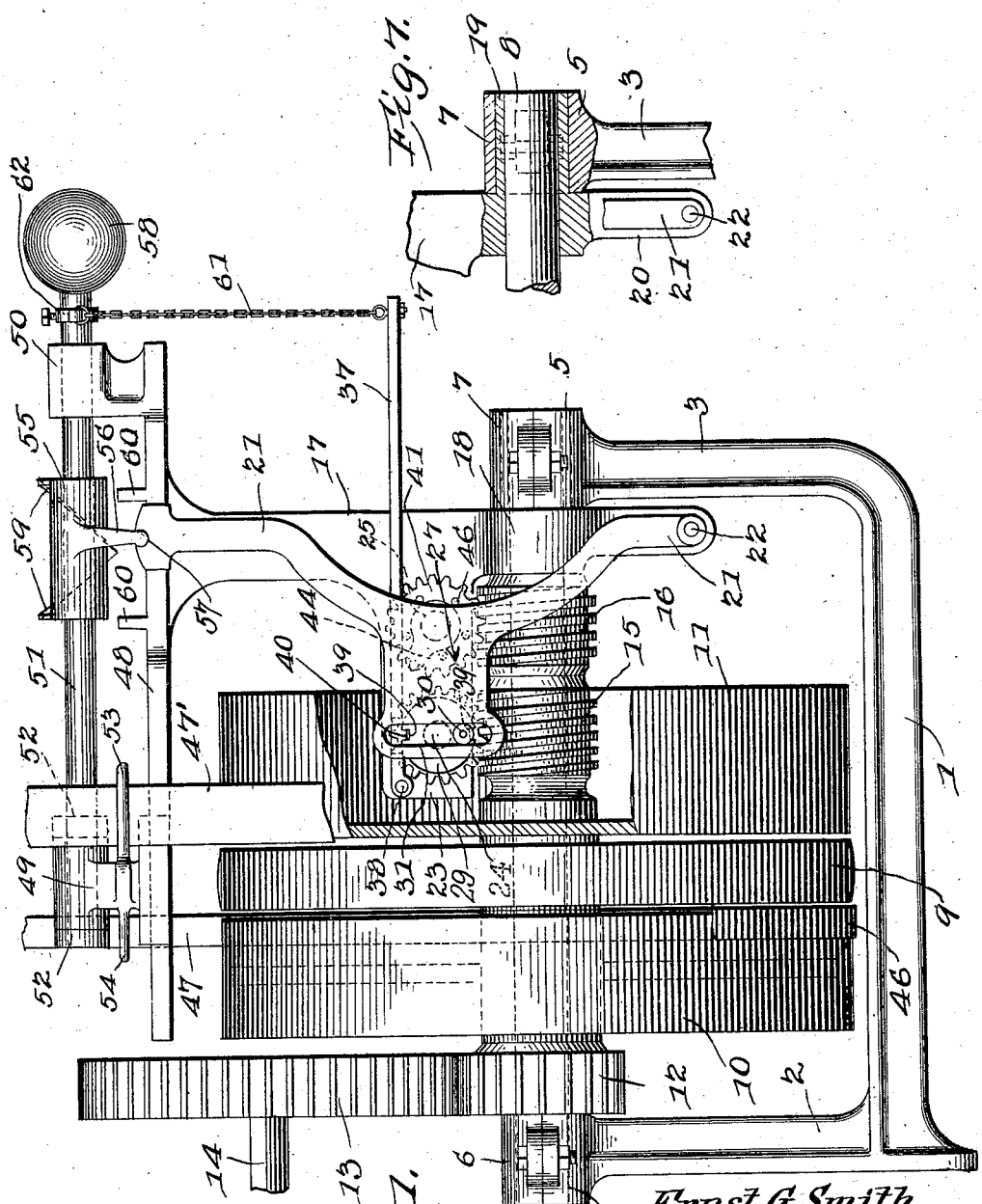

UNITED STATES PATENT OFFICE.

ERNST G. SMITH, OF COLUMBIA, PENNSYLVANIA.

REVERSING-GEAR.

No. 859,984.   Specification of Letters Patent.   Patented July 16, 1907.

Application filed March 23, 1906. Serial No. 307,691.

*To all whom it may concern:*

Be it known that I, ERNST G. SMITH, a citizen of the United States, residing at Columbia, in the county of Lancaster and State of Pennsylvania, have invented a new and useful Reversing-Gear, of which the following is a specification.

This invention relates to reversing gears and has for its object to provide certain new and useful improvements therein whereby the reversing operation is prompt and effective.

It is also designed to overcome the defect of having the gear run longer in one direction than in the other direction, or, in other words, to insure the uniform period of rotation in each direction.

A still further object of the invention is to embody the same in practicable and compact form whereby the device may be conveniently applied to any character of machine where it is desired to run first in one direction and then in the opposite direction.

With these and other objects in view, the present invention consists in the combination and arrangement of parts as will be hereinafter more fully described, shown in the accompanying drawing and particularly pointed out in the appended claims, it being understood that changes in the form, proportion, size and minor details may be made, within the scope of the claims without departing from the spirit or sacrificing any of the advantages of the invention.

In the drawing: Figure 1 is an elevation of one embodiment of the reversing gear of the present invention, a part of one of the loose pulleys being broken away to disclose certain parts of the device. Fig. 2 is an end view of the device with the frame broken away. Fig. 3 is a plan view of a detail of the device. Fig. 4 is a detail sectional view on the line 4—4 of Fig. 3. Fig. 5 is a similar view on the line 5—5 of Fig. 3. Fig. 6 is a detail view of the releasing cam. Fig. 7 is a detail sectional view.

Similar numerals of reference designate corresponding parts in all of the figures of the drawing.

For the support of the operating parts of the present invention, there is provided a yoke-shaped frame including a substantially horizontal base 1 having upstanding sides or standards 2 and 3 rising from the ends of the member 1. These frame portions are flanged to stiffen the same, and the flanges of the member 2 serve for attaching the frame to the frame of a machine to be driven. The tops of the frame members 2 and 3 terminate in the respective semicircular bearing boxes 4 and 5, over which fit the caps 6 and 7 which hold the shaft 8 in place.

Upon the shaft 8 is a fixed or fast pulley 9 located between the arms 2 and 3 of the frame, and at opposite sides of the fixed pulley are loose pulleys 10 and 11. Between the loose pulley 10 and the arm 2 is a pinion 12 fast upon the shaft and designed to mesh with a gear 13 carried by the shaft 14 of the machine to be driven.

While the present device is capable of use in connection with nearly any character of machine, it has been primarily designed for use in connection with rotary washing machines to drive the latter first in one direction and then in the opposite direction.

The pulley 11 carries a worm 15 which is fixed thereto but loose upon the shaft 8, and another worm 16 is fixed to the shaft 8 adjacent the outer end of the worm 15, the two worms having their spiral teeth running in the same direction. Between the outer worm 16 and the arm 3 of the frame, there is an upright bracket 17 which is provided with an eye 18 loosely receiving the shaft 8 and provided with a laterally directed sleeve 19 received in the bearing 5 and rigidly clamped therein by the cap 7, whereby the arm 17 is rigidly supported and may be shifted to opposite sides of the vertical according as the drive belts lead to the pulleys from the right or the left. The bracket 17 extends below the shaft and constitutes a hanger for the support of a swinging upright arm 21 which is pivotally supported upon the hanger 20, as at 22. This swinging arm is designed to control the belt shifter and is in turn controlled by the worms 15 and 16 in the following manner.

The bracket 17 is provided with a lateral extension or arm 23 overhanging the shaft 8, and this extension carries a pair of substantially parallel stub shafts 24 and 25. Where the arm 23 is pierced by the shafts, it is provided upon its rear side with an enlargement 26 to form an elongated bearing for the shafts. The shaft 24 is over the worm 15 and is designed to be driven thereby, while the shaft 25 is over the worm 16 so as to be driven thereby. In front of the lateral extension 23 and in substantial parallelism therewith, there is an arm or extension 27 projecting from the arm 21. Between the parts 27 and 23, and loose upon the shaft 24 is a worm wheel 28 in mesh with the worm 15 which is carried by the loose pulley 11, wherefore the wheel 28 is driven from the loose pulley 11. The outer end of the shaft 24 terminates in a fixed crank disk 29 lying adjacent the inner face of the part 27 and provided with a crank pin 30 working in a vertical slot 31 in the part 27, whereby the arm 21 is swung back and forth upon its pivotal support by the action of the crank pin 30 in the slot 31. In order that the loose worm wheel 28 may rotate the shaft 24, the shaft is projected a suitable distance in rear of the part 23 and provided with a nut 32 and a helical spring 33 embracing the shaft and bearing in opposite directions against the nut 32 and the bearing 26 with a tendency to draw the shaft rearwardly and frictionally bind the worm wheel 28 between the disk 29 and the forward end of a rotatable bushing 34 embracing the shaft and passing through the bearing 26. A washer 35 is interposed between the crank disk 29 and the wheel 28, and another washer 36 is interposed between the wheel 28 and the inner end of the bushing 34, the latter being longer than the bearing 26 so as to hold the washer 36 away from the stationary part 23. By this arrangement, when the spring holds the parts, 29, 35, 28, 36 and 34 in successive frictional engagement, the wheel 28 rotates the shaft 24, and the latter swings the arm 21 through the medium of the crank pin 30 working in the slot 21.

For the purpose of locking the shaft 24 against rotation, there is a latch arm 37, pivoted as at 38, upon the outer end portion of the part 23 so as to gravitate against the top of the disk 29, the latter being provided with diametrically opposite notches 39 into which a projection 40 of the latch 37 is designed to successively drop and thereby hold the shaft against rotation. By the provision of this latch, the shaft 24 may be held stationary while the wheel 28 is rotating under the driving influence of the worm 15, and when it is desired to swing the arm 21, the latch is lifted so as to release the shaft 24 and permit rotation thereof through the frictional engagement between the disk 29 and the wheel 28. With the latch released, and the pulley 11 rotating, the worm 15 will rotate the wheel 28 and the shaft 24 and thereby swing the arm 21 by the action of the crank pin 30.

It is proposed to automatically control the latch 37 for locking and releasing the shaft 24, and this is accomplished in the following manner. The shaft 25 is fixed upon the part 23 and carries a worm wheel 41 loosely rotatable thereon and in mesh with the worm 16 so as to rotate upon the shaft 25 when the worm 16 is rotated. Upon the front end of the shaft is a loosely rotatable disk 42 having a hub 43 upon its rear side to space the disk from the worm wheel so as to lie in the same plane with the crank disk 29 on the shaft 24 and the latch arm 37. A radial projection or tappet arm 44 extends from the periphery of the disk 42, and is of a length to strike the under side of the latch arm 37. In the front of the wheel 41 there is an annular series of sockets 45 for the individual reception of one or a pair of pins 46, each of which is of a length to overlap the periphery of the disk 42 for contact with the arm 44 so as to rotate the disk with the wheel to bring the arm 44 into engagement with the under side of the latch arm 37 for the purpose of lifting the latter to free the shaft 24.

It will here be explained that two belts are employed in connection with the present gear, such for instance, as shown at 47 and 47′, one of the belts being twisted so as to transfer power in an opposite direction to the other belt. The belt 47 coöperates with the loose pulley 10 and is of a width to be entirely out of engagement with the fast pulley 9 when thrown upon the loose pulley 10, while the belt 47′ is wider so as to be always in engagement with the loose pulley 11, wherefore the worm 15 is always rotating with the pulley 11 and in the same direction.

With the parts of the device in the relation shown in Fig. 1, the shaft 24 is locked by the latch 37, and as the worm 16 is always in rotation, the worm-wheel 41 is likewise rotating loosely upon the fixed shaft 25. When one of the pins 46 carried by the worm 41 engages the tappet arm 44, the disk 42 will be rotated, and the arm 44 will strike the under side of the latch arm 37 so as to elevate the latter and release the shaft 24. Just as soon as the shaft 24 has been released, the frictional engagement between the parts 29, 35, 28 and 36, will be sufficient to rotate the shaft and the disk 29, thereby moving the crank pin 30 in the slot 31 which swings the arm 21 to the right or the left according to the direction of rotation of the shaft 24. When the latch 37 has been lifted out of the notch 39, the projection 40 will rest upon the periphery of the disk 29 during the rotation of the latter until the opposite notch 39 comes into alinement with the projection 40, whereupon the latter will drop into the notch and again lock the shaft 24 against rotation, the wheel 28 of course continuing to rotate loosely upon the shaft 24 as it is positively driven by the worm 15. The movement of the arm 21 from one limit to the other, of course shifts one belt from the fast pulley 9 and the other belt to the fast pulley, whereby the direction of rotation of the fast pulley will be reversed, and consequently the direction of rotation of the worm 16 will likewise be reversed as the worm is fixed upon the shaft 8. When the direction of rotation of the worm 16 reverses, the direction of rotation of the worm wheel 41 will be reversed, and therefore the other pin 46 will travel up and lift the arm 44 into engagement with the latch 37 so as to disengage the latter from the shaft 24 and permit rotation of the shaft from the disk 29 to swing the arm 21 in the reverse direction.

It will here be explained that the arm 21 remains stationary at each limit of its movement during the time it requires for one of the pins 46 to come into engagement with the arm 44, after which the arm 21 swings to its other limit during the rotation of the shaft 24, whereupon it again becomes stationary so long as the disk 29 and the shaft 24 are locked against rotation by the latch 37. By this arrangement, the arm 21 is positively moved at regular intervals so as to insure the same number of rotations of the drive shaft 8 in each of its directions of movement. This is a very important feature, particularly in connection with washing machines, as it prevents the articles being washed from becoming tangled within the washing machine.

While any approved form of belt shifting means may be associated with the swinging arm 21, I prefer to employ that shown in the accompanying drawing. Upon the top of the bracket 17 there is a transverse arm which overhangs the pulleys and is provided at opposite sides with the bearings 49 and 50 in which a slidable bar 51 is mounted to rotate and to reciprocate. The bearing 50 is fixed, whereas, the bearing 49 slides upon the arm 48 with the bar 51, there being suitable collars or the like 52 fixed upon the bar 51 at opposite sides of the bearing 49 to hold the bar against endwise movement through the bearing. A belt engaging element, preferably a loop 53 projects from the bearing 49 and receives the belt 47′, while another belt engaging element 54 projects from the bearing 49 at the opposite side thereof and receives the belt 47′, whereby the two belts are simultaneously shifted in the same direction with the endwise movement of the bar 51. A fixed sleeve or cylindrical enlargement 55 is provided upon the bar 51 and carries a downturned crank 56 having its upper end loosely received within a socket 57 in the top of the arm 21, whereby the bar 51 is slid back and forth by the swinging movement of the arm 21. A weighted crank handle 58 is carried by the outer end of the bar 51 to normally maintain the crank arm 56 in engagement with the swinging arm 21. A pair of converged spiral flanges 59 are provided upon the part 55 for simultaneous engagement with the inner sides of a pair of upstanding flanges or projections 60 rising from the arm 48, whereby, when the weighted handle 58 is swung upward, the arm 56 will be lifted out of engagement with the arm 21, and one or the other of the flanges 59 will wipe across the inner side of the adjacent projection 60 and thereby shift the bar 51 outward so as to center the bearing 49 between the loose pulleys 10 and 11, thereby to hold each of the driving belts out of engagement with the fast pulley 9 whenever it is desired to stop the operation of the machine to which the gear is coupled. In this position of the belt shifter, the loose pulleys still continue to rotate and the arm 21 will swing back and forth, but as the arm 56 is out of engagement with the arm 21, there will be no shifting of the belt shifter.

It is designed to release the latch arm 37 by the movement of the rock bar 51 when throwing the belt shifter out of operation. This is accomplished by means of a chain 61 connected to the outer end of the latch arm 37 and also connected to a crank arm 62 carried by the rock bar 51 adjacent the weighted crank handle 58. By this arrangement, when the crank handle 58 is thrown upward, the latch arm 37 is lifted out of the notch in the disk 29, whereby the shaft 24 is released and the arm 21 will swing back and forth under the influence of the crank pin 30, which porduces less friction and wear than if the shaft 24 was locked by the latch and the gear 28 rotated by the worm 15 against the frictional resistance of the washers 35 and 36.

Having thus described the invention, what is claimed is:

1. In a reversing gear, the combination of a driven shaft, a fixed pulley thereon, a loose pulley upon the shaft, a belt shifter, mechanism controlled by the movement of the loose pulley to actuate the belt shifter, locking means for the belt shifter actuating mechanism, and means controlled by the rotation of the shaft to release the locking means.

2. In a reversing gear, the combination of a driven shaft, a fixed pulley thereon, a loose pulley upon the shaft, a belt shifter, mechanism controlled by the loose pulley for actuating the belt shifter, said mechanism having a portion continuously driven by the loose pulley, locking means for the other portion of said mechanism, and means controlled by the shaft for releasing the locking device.

3. In a reversing gear, the combination of a driven shaft, a fixed pulley thereon, a loose pulley upon the shaft, a worm driven by the loose pulley, another worm fixed upon the shaft, worm wheels in mesh with the respective worms, belt shifting means controlled by one of the worm wheels, means to lock the belt shifting means, and means controlled by the other worm wheel to release the belt shifting means.

4. In a reversing gear, the combination of a driven shaft, a fixed pulley thereon, a loose pulley upon the shaft, a gear driven by the loose pulley, another gear fixed upon the shaft, belt shifting means controlled by the pulley gear, means to lock the belt shifting means, and means controlled by the shaft gear to release the belt shifting means.

5. In a reversing gear, the combination of a driven shaft, a fixed pulley thereon, a loose pulley upon the shaft, a gear driven by the loose pulley, another gear fixed upon the shaft, a drive gear in mesh with the pulley gear, a crank driven by the drive gear, a belt shifter associated with the crank, means to lock the crank, and a crank releasing gear in mesh with the shaft gear.

6. In a reversing gear, the combination of a driven shaft, a fixed pulley thereon, a loose pulley upon the shaft, a gear driven by the loose pulley, another gear fixed upon the shaft, a drive gear in mesh with the pulley gear, a crank disk driven by frictional engagement with the drive gear, a belt shifter associated with the crank disk, locking means for the crank disk, a releasing gear in mesh with the shaft gear, and means controlled by the releasing gear for releasing the locking means.

7. In a reversing gear, the combination of a driven shaft, a fixed pulley thereon, a loose pulley upon the shaft, a gear driven by the pulley, another gear fixed upon the shaft, a drive gear in mesh with the pulley gear, a crank disk driven by frictional contact with the drive gear and provided with diametrically opposite seats, belt shifting means associated with the crank disk, a latch having a projection for successive engagement with the seats of the crank disk to lock the same, a releasing gear in mesh with the shaft gear, and a tappet arm coöperating with the latch to release the same and controlled by the releasing gear.

8. In a reversing gear, the combination of a driven shaft, a fixed pulley thereon, a loose pulley upon the shaft, a gear driven by the loose pulley, another gear fixed upon the shaft, a rotatable stub shaft carrying a crank disk, a belt shifter associated with the crank disk, a drive gear loose upon the stub shaft and in mesh with the pulley gear, means to effect a frictional drive engagement between the drive gear and the crank disk, locking means for the crank disk, a fixed stub shaft, a releasing gear loose thereon and in mesh with the gear shaft, and a tappet arm loose upon the fixed shaft and intermittently driven by the releasing gear in coöperative relation with the locking means to release the latter.

9. In a reversing gear, the combination of a driven shaft, a fixed pulley thereon, a loose pulley upon the shaft, a gear driven by the loose pulley, a gear fixed to the shaft, a rotatable stub shaft, a drive gear loose upon the stub shaft and in mesh with the pulley gear, a crank disk carried by the stub shaft, a spring to yieldably maintain a frictional drive engagement between the disk and the drive gear, belt shifting means associated with the crank disk, a locking device for the crank disk, a releasing gear in mesh with the shaft gear, and a tappet arm intermittently controlled by the releasing gear to release the locking means.

10. In a reversing gear, the combination of a driven shaft, a fixed pulley thereon, a loose pulley upon the shaft, a gear driven by the loose pulley, a gear fixed upon the shaft, a drive gear in mesh with the pulley gear, a releasing gear in mesh with the shaft gear, a crank having a frictional drive connection with the drive gear, belt shifting means associated with the crank, means to lock the crank, a tappet arm to release the locking means, the releasing gear having an annular series of seats, and a tappet pin for removable engagement with the individual seats to engage and operate the tappet arm.

11. In a reversing gear, the combination of a driven shaft, a fixed pulley thereon, a loose pulley upon the shaft, a worm driven by the pulley, a worm fixed upon the shaft, a bracket, a rotatable shaft carried by the bracket and provided with a crank disk, belt shifting means associated with the crank disk, a worm wheel loose upon the rotatable shaft and in mesh with the pulley worm, means to yieldably maintain a frictional drive connection between the crank disk and the worm wheel, locking means for the crank disk, a fixed stub shaft carried by the bracket, a reversing worm wheel loose upon the fixed stub shaft and in mesh with the shaft worm, a tappet arm loose upon the fixed shaft, the reversing wheel being provided with an annular series of seats, and a tappet pin for individual engagement with the seats to engage the tappet arm and rotate the latter to release the locking means.

12. In a reversing gear, the combination of a bracket, a belt shifter slidable upon the bracket, a controller associated with the belt shifter, the belt shifter being rotatable for disconnection from the controller, and a spiral upon the belt shifter normally out of engagement with the bracket, a portion of the bracket being in the path of the spiral when the belt shifter is rotated to automatically slide the belt shifter and hold the belts on the loose pulleys.

13. In a reversing gear, the combination of a driven shaft, a fixed pulley thereon, a loose pulley upon the shaft, a gear driven by the loose pulley, another gear fixed upon the shaft, a drive gear in mesh with the pulley gear, a crank disk driven by frictional engagement with the drive gear, locking means for the crank disk, a releasing gear in mesh with the shaft gear, means controlled by the releasing gear for releasing the locking means, a belt shifter removably associated with the crank disk, and means controlled by the disassociation of the belt shifter from the crank disk to release the locking means.

14. In a reversing gear, the combination of a driven shaft, a fixed pulley thereon, a loose pulley upon the shaft, a gear driven by the pulley, another gear fixed upon the shaft, a drive gear in mesh with the pulley gear a crank disk driven by frictional contact with the drive gear and provided with diametrically opposite seats, a latch having a projection for successive engagements with the seats of the crank disk to lock the same, a releasing gear in mesh with the shaft gear, a tappet arm coöperating with the latch to release the same and controlled by the releasing gear, an endwise movable belt shifter associated with the crank disk and also capable of a rotary movement for disassociation with the crank disk, and means extending between the latch and the belt shifter to release the latch from the crank disk when the belt shifter is rotated to release it from the crank disk.

In testimony that I claim the foregoing as my own, I have hereto affixed my signature in the presence of two witnesses.

ERNST G. SMITH.

Witnesses:
B. C. SEIPLE,
GEO. R. EVANS.